(12) United States Patent
Cortinovis et al.

(10) Patent No.: US 7,644,809 B2
(45) Date of Patent: Jan. 12, 2010

(54) SPRING MEMBER FOR DISC-BRAKE CALIPERS AND DISC-BRAKE CALIPER

(75) Inventors: Gianpaolo Cortinovis, Dalmine (IT); Maurizio Mascheretti, Lallio (IT); Tomasz Woloszyn, Mozzo (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 374 days.

(21) Appl. No.: 10/565,672

(22) PCT Filed: Jul. 31, 2003

(86) PCT No.: PCT/IT03/00484

§ 371 (c)(1),
(2), (4) Date: Jul. 7, 2006

(87) PCT Pub. No.: WO2005/012753

PCT Pub. Date: Feb. 10, 2005

(65) Prior Publication Data

US 2007/0137952 A1      Jun. 21, 2007

(51) Int. Cl.
*F16D 65/097*   (2006.01)

(52) U.S. Cl. ............ 188/73.38; 188/73.36; 188/205 A; 188/250 E

(58) Field of Classification Search .............. 188/73.35, 188/73.36, 73.37, 73.38, 205 A, 250 E
See application file for complete search history.

(56) References Cited

U.S. PATENT DOCUMENTS

| | | | |
|---|---|---|---|
| 5,941,348 A | 8/1999 | Matsumoto et al. | |
| 6,003,642 A | 12/1999 | Mori et al. | |
| 6,269,915 B1 * | 8/2001 | Aoyagi | 188/73.38 |
| 6,478,122 B1 | 11/2002 | Demoise, Jr. et al. | |
| 6,527,090 B1 | 3/2003 | Barillot et al. | |

OTHER PUBLICATIONS

International Application dated Dec. 17, 2003 for International Application No. PCT/IT2003/000484.

* cited by examiner

*Primary Examiner*—Thomas J Williams
(74) *Attorney, Agent, or Firm*—Hogan & Hartson LLP

(57) ABSTRACT

A spring member for disc-brake calipers is interposed between a lateral edge of at least one pad and reaction surfaces of the caliper so as to act resiliently on the pad. The spring member comprises a 'U'-shaped portion suitable for forming a connection with a protuberance of the reaction surfaces, a first resilient portion suitable for acting on the pad in a tangential direction, and a second resilient portion suitable for acting on the pad in a radial direction. The first and second resilient portions constitute a single body projecting from a first connection end of the first resilient portion that is connected to the 'U'-shaped portion, so that, when the at least one pad is in a mounted configuration, it is acted on resiliently by the spring member both in a radial direction and in a tangential direction.

14 Claims, 10 Drawing Sheets

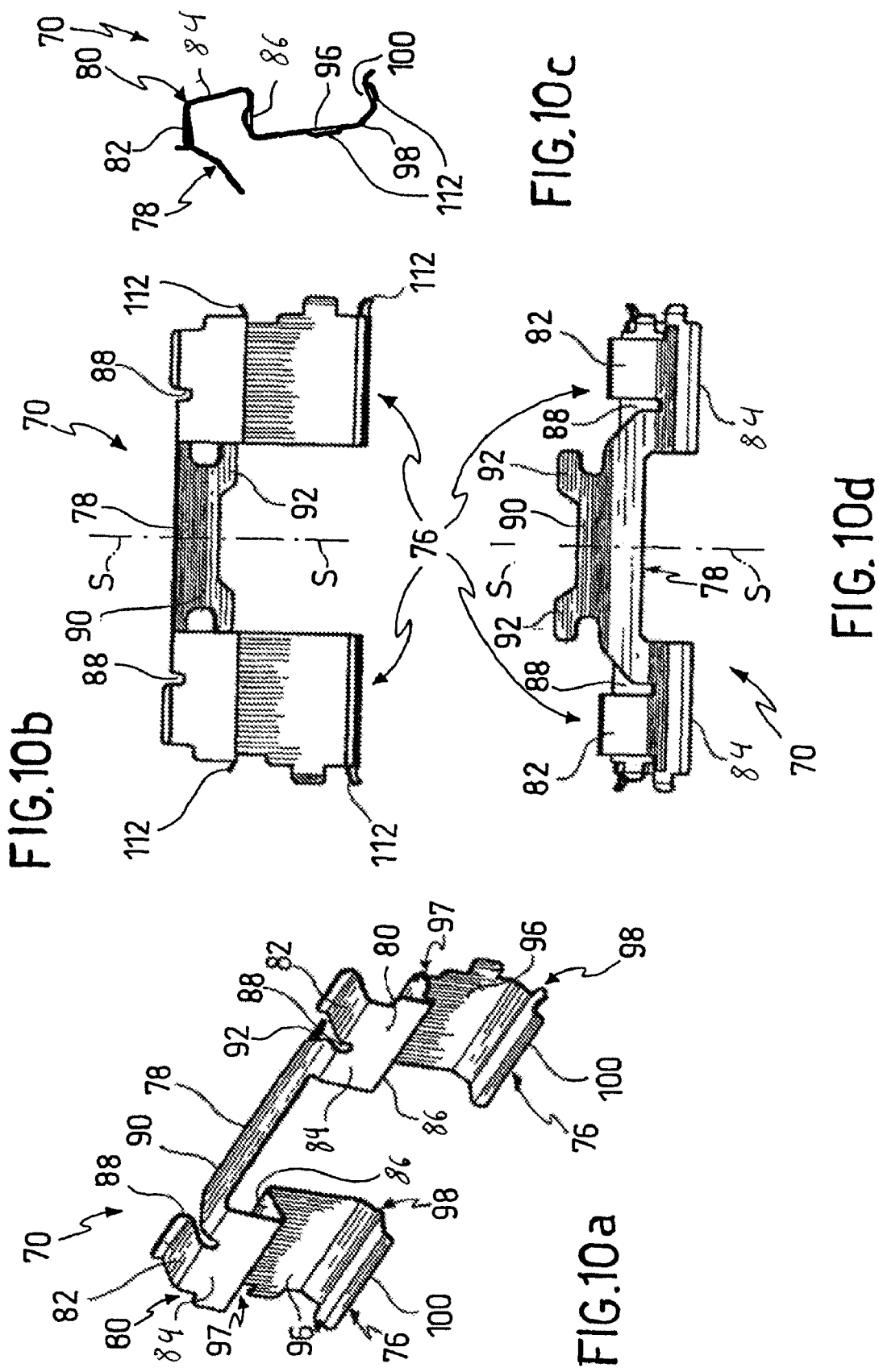

SPRING MEMBER FOR DISC-BRAKE CALIPERS AND DISC-BRAKE CALIPER

FIELD OF INVENTION

The present invention relates to a spring member for disc-brake calipers; in particular, the present invention relates to a spring member suitable for cooperating with disc-brake caliper pads so as to limit their vibrations, particularly when they are not engaged in braking, as well as to a caliper comprising such a spring member.

BACKGROUND OF THE INVENTION

As is known, owing to the tolerances between the plates of the pads and the respective housing spaces in disc-brake calipers, the pads are subjected to movements, predominantly in axial and tangential directions, which very frequently set up vibrations that lead to annoying noise.

To prevent these problems, there are known constructions of spring members which are interposed between the pads and the reaction shoulders of the calipers so as to exert a resilient force against the pads to prevent undesired movements thereof. However, these spring members nevertheless permit movements of the pads which can give rise to the above-mentioned vibrations and effective anchorage of the spring members to the caliper is not ensured.

The problem of the present invention is that of providing a spring member for disc-brake calipers which overcomes the problems mentioned with reference to the prior art.

SUMMARY OF TEE INVENTION

These problems and limitations are solved by a spring member for disc-brake calipers according to claim 1.

BRIEF DESCRIPTION OF THE DRAWINGS

Further embodiments of the spring member according to the invention are described in the subsequent claims.

Further characteristics and the advantages of the present invention will be understood better from the following description of a preferred and non-limiting embodiment thereof, in which.

DETAILED DESCRIPTION OF THE INVENTION

Figure 1:
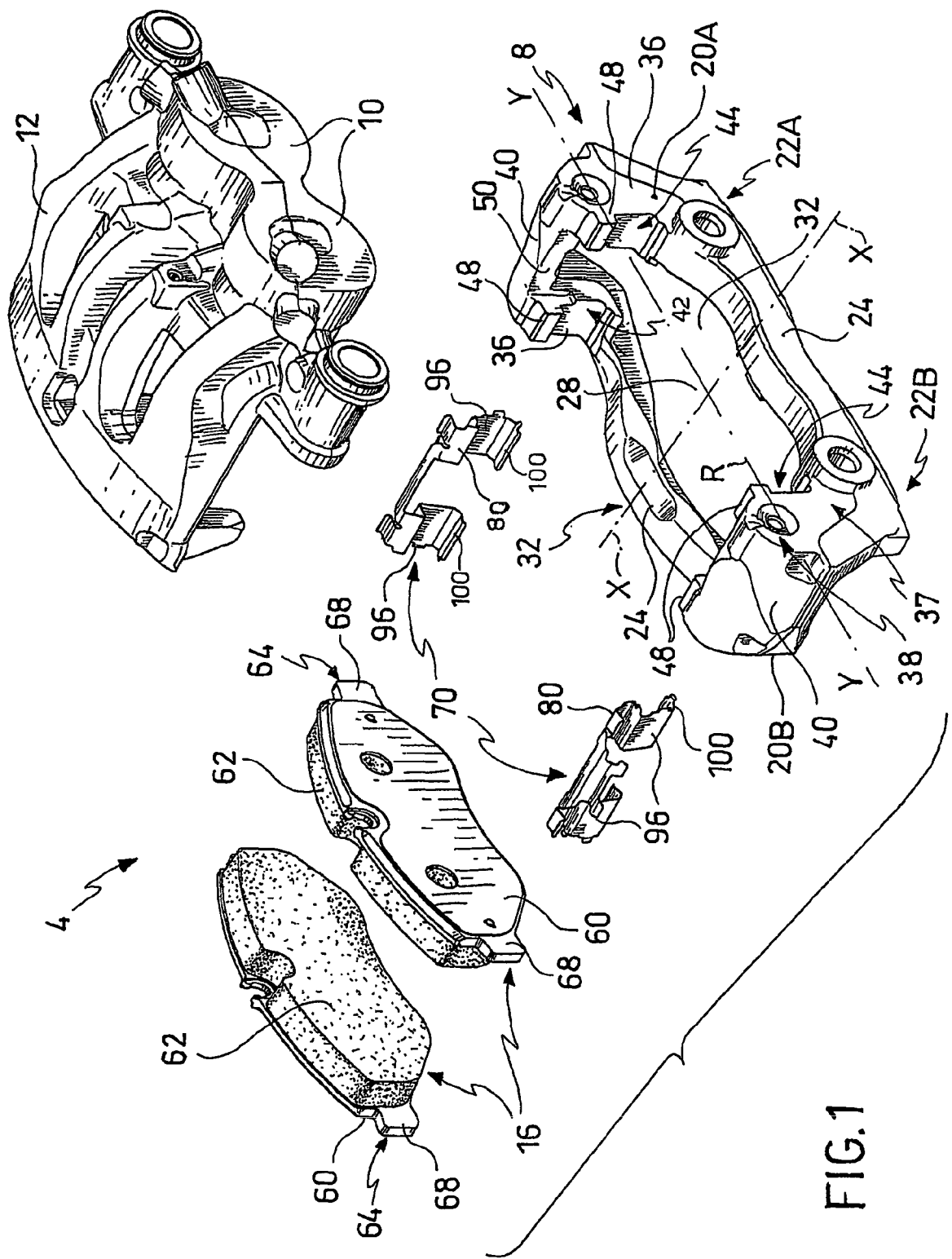
FIG. 1 is a perspective view of a brake caliper according to the present invention, with parts separated.
Figure 2:
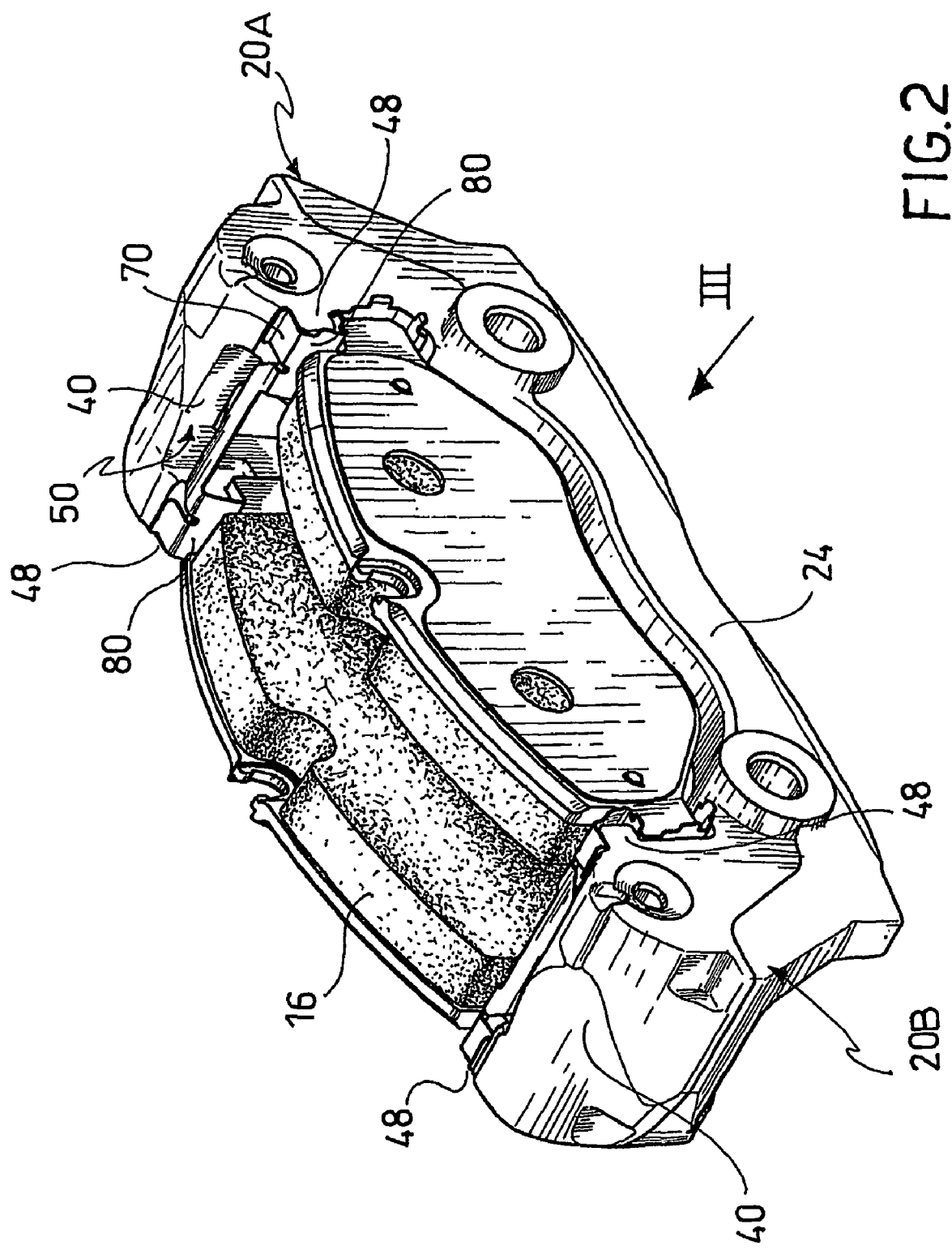
FIG. 2 is a general perspective view of some components of the caliper of FIG. 1.
Figure 3:
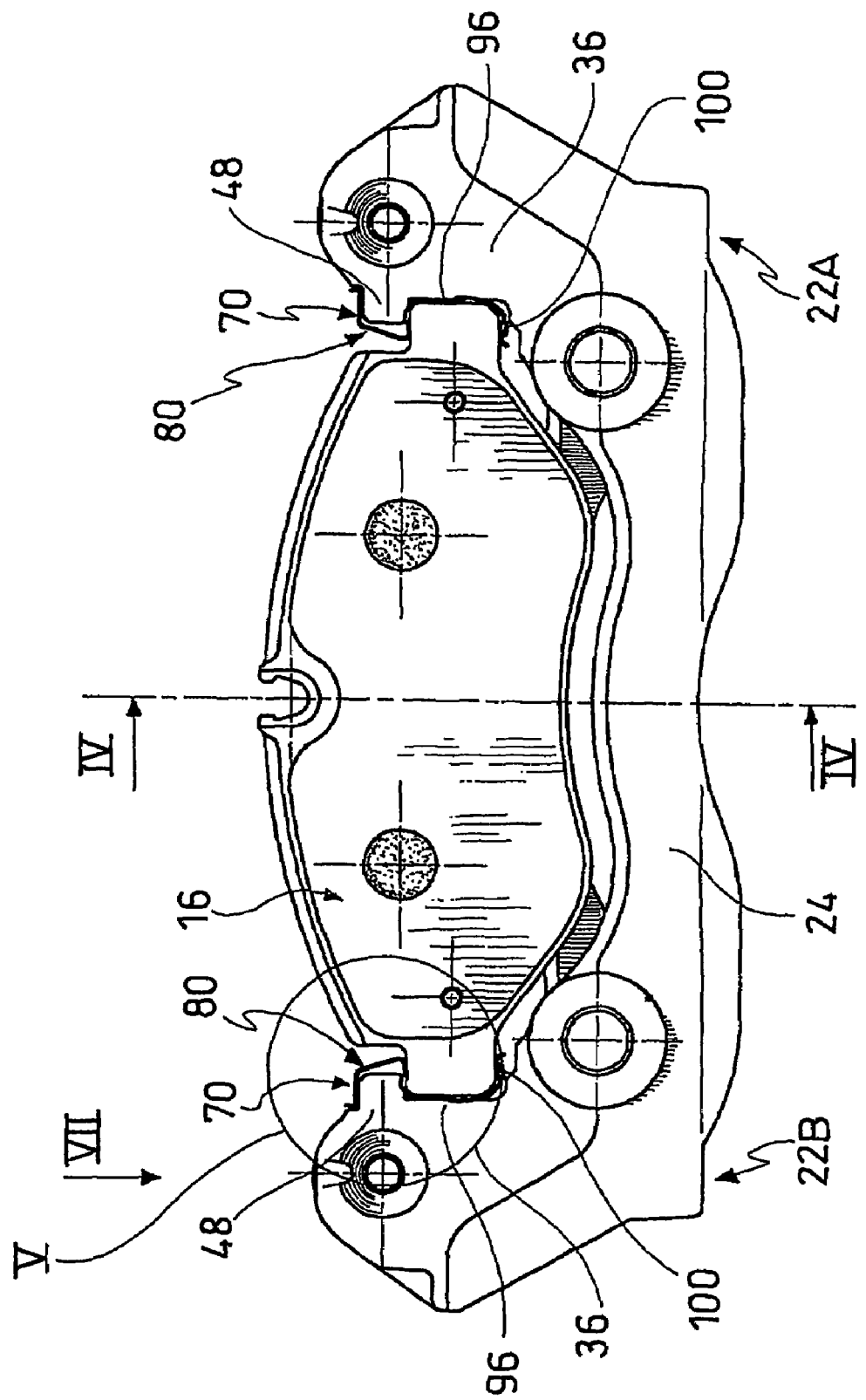
FIG. 3 is a side view of the caliper of FIG. 1 from the side indicated by the arrow III in FIG. 2.
Figure 4:
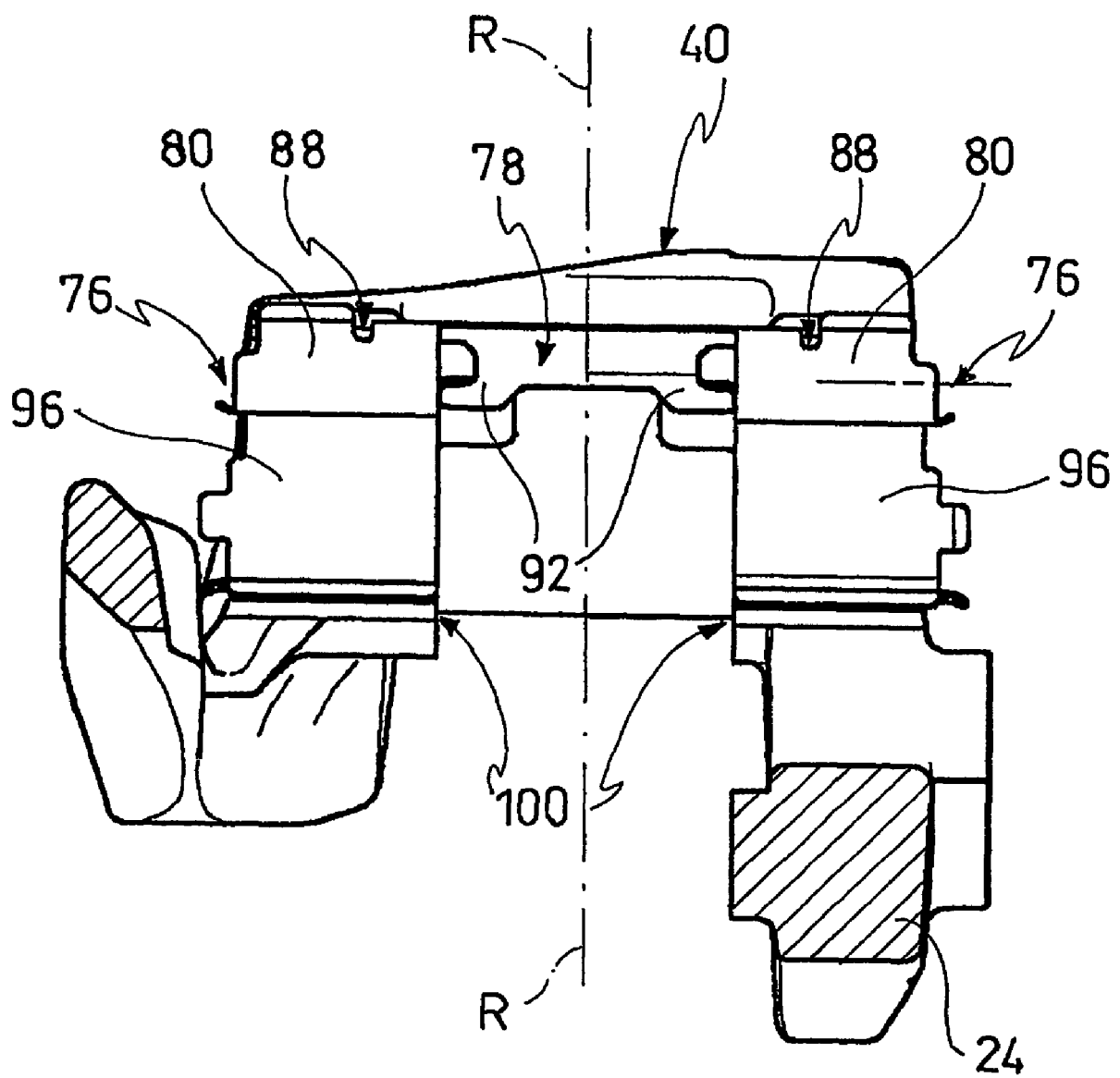
FIG. 4 is a section taken on the line IV-IV of FIG. 3 through the caliper of FIG. 1, without pads.

Elements or parts of elements which are common to the embodiments described below will be indicated by the same reference numerals.

The term "axial direction X" means a direction substantially parallel to the axis of rotation of the compatible brake disc.

The term "tangential direction Y" means a direction substantially perpendicular to the axial direction and parallel to the braking band of the compatible brake disc.

The term "radial direction Z" means a direction substantially perpendicular to the axis of rotation of the brake disc compatible with the disc-brake caliper and perpendicular to the axial direction and the tangential direction.

With reference to the above-mentioned drawings, a disc-brake caliper unit for braking a brake disc, not shown, is generally indicated 4.

The caliper unit 4 is arranged astride a braking disc so as to extend in the region of at least a braking band of the disc.

The present invention may be applied to a disc-brake caliper of any type, for example, a fixed or floating caliper formed as a single body or as two half-calipers. The following description will refer to a floating caliper which represents a preferred but non-limiting example of the application of the present invention.

According to an embodiment relating to a floating caliper, the caliper unit comprises a fixed portion or yoke 8 to be connected firmly to a caliper support, for example, a stub axle, and a movable portion or body 12 which is connected to the yoke 8 so as to be slidable axially relative thereto during braking. Said movable portion 12 is connected to the fixed portion 8, for example, by means of suitable rods, not shown, on which the movable portion 12 slides.

At least one piston, for example, a single-acting piston, is housed in a respective cylinder 10 in the movable portion 12 and is guided for sliding so as to be able to exert a thrust force on at least one pad 16 towards the braking surface of the brake disc.

The yoke 8 has a generally box-like structure and comprises two bridge portions 20A, 20B at opposite tangential ends 22A, 22B. The bridge portions 20A, 20B are connected to one another by a pair of crosspieces 24 which extend substantially in the tangential direction Y.

The yoke 8 as a whole comprises a seat 28 suitable for housing a portion of brake disc on which a braking force is exerted and comprises, in the region of each crosspiece 24, a space 32 for housing at least one pad 16.

The seat 28 preferably has a central plane R which is perpendicular to the axial direction X and can be superimposed on a plane of symmetry of the compatible brake disc.

Each bridge portion 20A, 20B comprises two posts 36 which extend substantially perpendicularly relative to the crosspieces 24, to which they are connected at respective first ends 37. Moreover, at respective second ends 38 radially remote from the first ends 37, the posts 36 are joined together by two respective arches 40 which can be arranged astride the compatible brake disc.

Each post 36 comprises, on a reaction face or surface 42 facing towards the housing space 32, a reaction shoulder 44 for a pad 16, which reaction shoulder 44 is suitable for forming a stop for the pad 16, in particular during braking.

According to one embodiment, a protuberance 48 projects from the reaction surface 42 into the housing space 32, in the tangential direction Y, preferably in the vicinity of the second end 38 of the post 36.

The protuberance 48 is preferably delimited in the radial direction Z by an upper surface 48' facing radially outwards, that is, away from the crosspieces 24, and by a lower surface 48" which faces towards the crosspieces 24; the protuberance 48 is delimited tangentially by a vertical surface 48''' substantially perpendicular to the upper and lower surfaces 48' and 48". The upper and lower surfaces 48' and 48" are preferably parallel to one another and arranged tangentially.

According to one embodiment, the post 36 has a generally concave configuration facing towards the housing space 32 in the vicinity of the first end 37.

The protuberance 48 constitutes a type of support projecting from each reaction shoulder 44. The protuberance 48 and the first end 37 of the post 36 together delimit a "C"-shaped portion 49 suitable for constituting a radial locating element for the pad 16.

Each arch 40 comprises a front surface 50 which, for example, is substantially flat and which faces towards the seat 28.

In a joining region between each arch 40 and the two respective posts 36 there are preferably two recesses 52, arranged substantially symmetrically with respect to the central plane R and facing the seat 28 for the compatible brake disc.

The caliper unit 4 comprises at least one pair of pads 16 which, according to one embodiment, are identical and axially opposed, that is, they are mounted in each housing space 32, on opposite sides of the compatible brake disc, facing the respective pistons or thrust surfaces. The term "thrust surfaces" means those surfaces of movable parts which are remote from the cylinders and which, in floating calipers, can press the pads against the braking band.

Each pad 16 preferably comprises a support plate 60 for supporting a friction lining 62. Each support plate 60 is provided laterally and on opposite sides, in a tangential direction Y, with lateral edges 64 which constitute stop means for the pad and which are intended to abut the respective reaction shoulders 44 during braking.

In the region of the lateral edges 64, the pads 16 preferably comprise appendages 68 suitable for being housed in the "C"-shaped portions 49.

A spring member 70 can advantageously be interposed between the lateral edge 64 of a pad 16 and the reaction surfaces 42 of the caliper so as to act resiliently on the pad 16.

According to a preferred embodiment shown, for example, in FIGS. 10A-10D, the spring member 70 comprises two limbs 76 and a connecting arm 78 between the limbs 76.

Preferably, the spring member 70 has a plane of symmetry S so that, when it is in a fitted configuration in the caliper, the plane of symmetry S is superimposed on the central plane R of the seat 28 and of the compatible brake disc so that the spring member 70 is mounted astride the brake disc.

Each of the limbs 76 can cooperate with the lateral edges 64 of the pad 16 and with a corresponding reaction surface 42 of the fixed portion 8 so as to fix the spring member 70 to the reaction surfaces 42 and to act resiliently on the pad 16.

In particular, each limb 76 comprises a 'U'-shaped portion 80 suitable for forming a connection with a protuberance 48 of the reaction surfaces 42. The 'U'-shaped portion 80 preferably has a substantially trapezoidal shape suitable for forming a coupling or engagement, preferably a snap-coupling or snap-engagement, with the protuberance 48.

The 'U'-shaped portion 80 can achieve a form fit with the corresponding protuberance 48 so as to ensure the correct location and fixing of the spring member 70 on the reaction surfaces 42.

According to one embodiment, the 'U'-shaped portion comprises a first, for example straight, section 82 which is suitable for interacting with the upper surface 48' of the protuberance 48 and is oriented substantially tangentially when the spring member 70 is in the fitted configuration.

The 'U'-shaped portion 80 comprises a second, for example straight, section 84 which is connected to the first section 82 and is inclined thereto so as to be inclined towards the housing space 32 and facing the vertical surface 48''' in a fitted configuration.

The 'U'-shaped portion 80 comprises a third, for example straight, section 86 which is connected to the second section 84 and is substantially parallel to the first section 82 so as to interact with the lower surface 48" of the protuberance 48.

The first section 82 preferably converges with the third section 86, in the direction away from the second section 84.

Preferably, the third section 86 is arranged parallel to the lower surface 48", is in contact therewith, and has a tangential extent greater than that of the lower surface 48", that is, of the protuberance 48. A bearing portion 49' of the second section 84 thus comes into abutment with the lower surface 48" whereas a projecting portion 49" of the second section 84 projects tangentially from the protuberance 48 towards the housing space 32 so as to constitute an extension of the lower surface 48" and a radial restraint for the pad.

The connecting arm 78 between the limbs 76 is disposed in the region of the 'U'-shaped portion, in particular, in the region of the first sections 82 of two adjacent limbs 76.

In the region of the portion of the connecting arm 78 that is attached to the two limbs 76, each limb 76 preferably comprises a notch or recess 88 for separating the connecting arm 78 from the first section 82 and permitting resilient relative bending between the connecting arm 78 and the first section 82 of each limb 76.

The connecting arm 78 advantageously comprises a thrust portion 90 having the function of a support which can come into abutment with an internal surface of a respective arch 40, that is, a surface facing towards the seat 28 for the compatible brake disc.

In particular, the thrust portion 90 can abut the internal surface of the arch 40 in a manner such as to form a restraint in relation to pivoting of the spring member 70 when it is acted on by the pads 16, particularly during braking.

In the vicinity of the thrust portion 90, the connecting arm 78 advantageously comprises two fingers 92 which are disposed on opposite sides of the plane of symmetry S, are arranged axially, and are suitable for ensuring the axial location and/or clamping of the spring member 70.

In particular, the fingers 92 can cooperate with the recesses 52 of the fixed portion 8 so as to create a bilateral axial restraint for the spring member 70.

The fingers 92 may be inserted in the recesses 52 either with a force fit or with slight clearance.

Each limb 76 of the spring member 70 further comprises a first resilient portion 96 which extends substantially in the radial direction Z from a first connection end 97 to a second connection end 98 and can act on the pad tangentially.

The first connection end 97 of the first resilient portion 96 is operatively connected to the 'U'-shaped portion, in particular, to the third section 86.

In one embodiment, the first resilient portion 96 is substantially straight and is inclined so that, when the spring member 70 is in the fitted configuration on the reaction surfaces 42, the first connection end 97 is in contact with the reaction shoulders 44 and the second connection end 98 is arranged further towards the interior of the housing space 32 than the first connection end in the tangential direction.

In other words, the first resilient portion 96 is inclined at an acute angle of less than 90 sexagesimal degrees to the third section 86 of the 'U'-shaped portion 80.

The spring member 70 further comprises a second resilient portion 100 which extends substantially in a tangential direction Y, is operatively connected to the first resilient portion 96 in the region of the second connection end 98, and can act on the pad 16 in a radial direction Z.

The second resilient portion 100 is connected to and projects from the first resilient portion 96.

In particular, the second resilient portion 100 is inclined to the first resilient portion 96 at an angle of less than 90 sexagesimal degrees.

In other words, the free end of the second resilient portion 100 is arranged radially further out, that is, away from the crosspieces 24, than the end of the second resilient portion 100 which is connected to the first resilient portion 96.

The first resilient portion 96 and the second resilient portion 100 form a single body projecting from the first connection end 97 of the first resilient portion 96 so that, when the spring member 70 and the respective pad 16 are in a fitted configuration in the housing space 32, the pad 16 is acted on resiliently by the spring member both in a radial direction Z and in a tangential direction Y, whether or not a braking force is being applied.

The spring member 70 advantageously comprises a plurality of lead-in tabs 112 for facilitating the axial insertion of the pads 16 in the respective housing spaces 32.

In particular, the lead-in tabs 112 are oriented substantially axially away from the plane of symmetry S of the spring member 70.

According to one embodiment, the lead-in tabs 112 are arranged along outer lateral edges of the limbs 76, that is, edges remote from the plane of symmetry S.

The lead-in tabs 112 are preferably arranged along the third section 86 of the 'U'-shaped portion 80 and along the first and second resilient portions 96, 100.

The fitting of the spring members 70 according to the invention and of the pads 16 on the fixed portion 8 of a disc-brake caliper will now be described.

In a disc-brake caliper without pads 16, the spring member 70 is moved up to the protuberances 48 of the reaction surfaces 42 so as to fit the 'U'-shaped portions 80 of the spring member 70 onto the protuberances 48 with a snap-coupling and to fit the fingers 92 in the respective notches or recesses 88.

A spring member 70 is mounted on the reaction surfaces 42 of each of the two bridge portions 20A, 20B.

Figure 5:
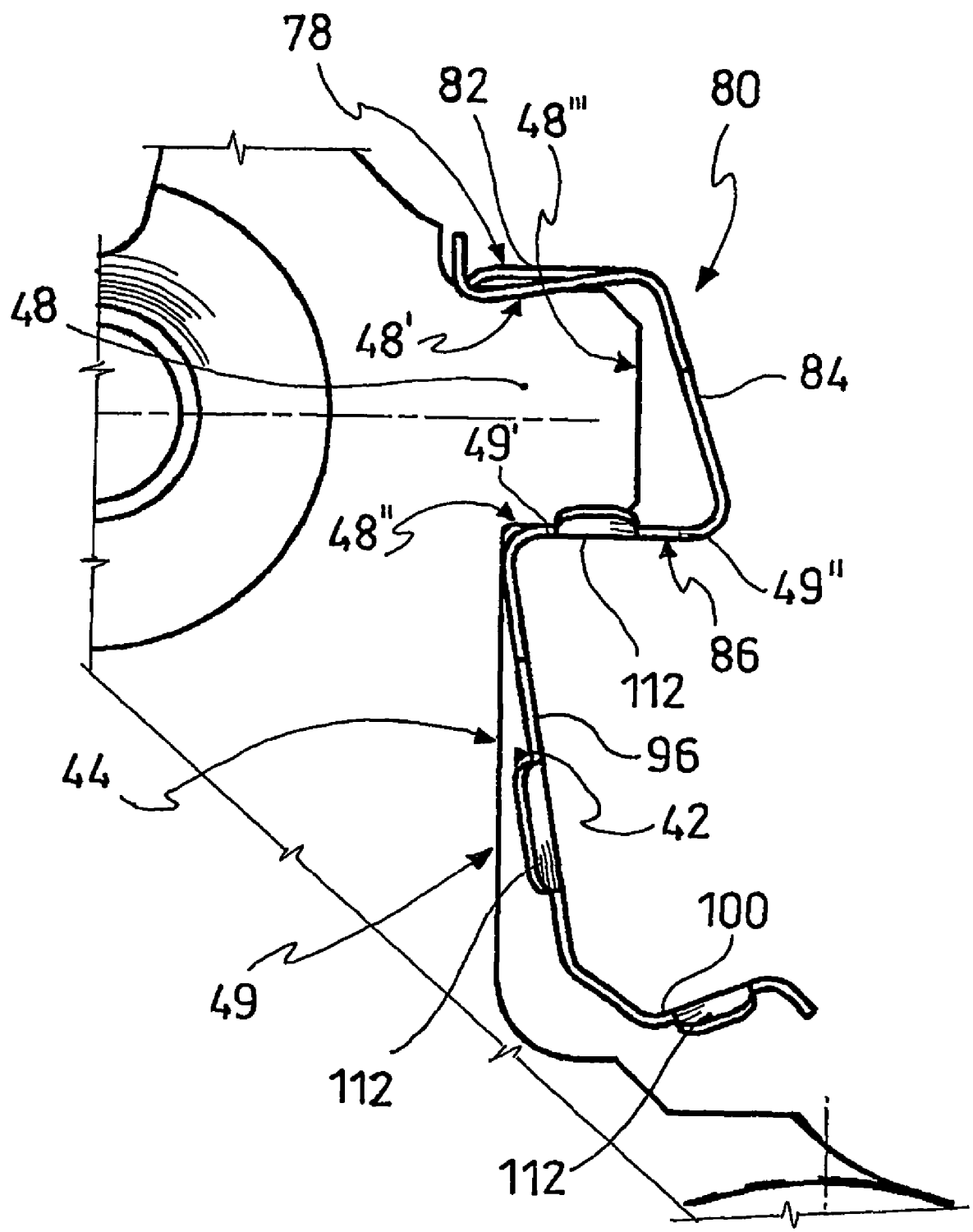
FIG. 5 is an enlarged view of a detail, indicated V in FIG. 3, of the caliper of FIG. 1, in a configuration without the pads fitted.

After the spring members 70 have been mounted on opposed reaction surfaces 42, each spring member 70 has the first and second resilient portions, which constitute a single body, substantially pivoted towards the housing space relative to the first connection end 97 of the first resilient portion 96, as shown in FIG. 5.

The pads 16 are then mounted by being inserted axially towards the central plane R, that is, by pushing the pads axially from the exterior of the caliper towards the respective housing spaces; during the insertion stage, the pads 16 are guided by the lead-in tabs 112.

After the pads 16 have been mounted, the spring members 70 are preloaded both radially and tangentially. In particular, the first and second resilient portions 96, 100, constituting a single cantilevered body, pivot about a fulcrum at the first connection end 97 of the first resilient portion 96.

Figure 6:
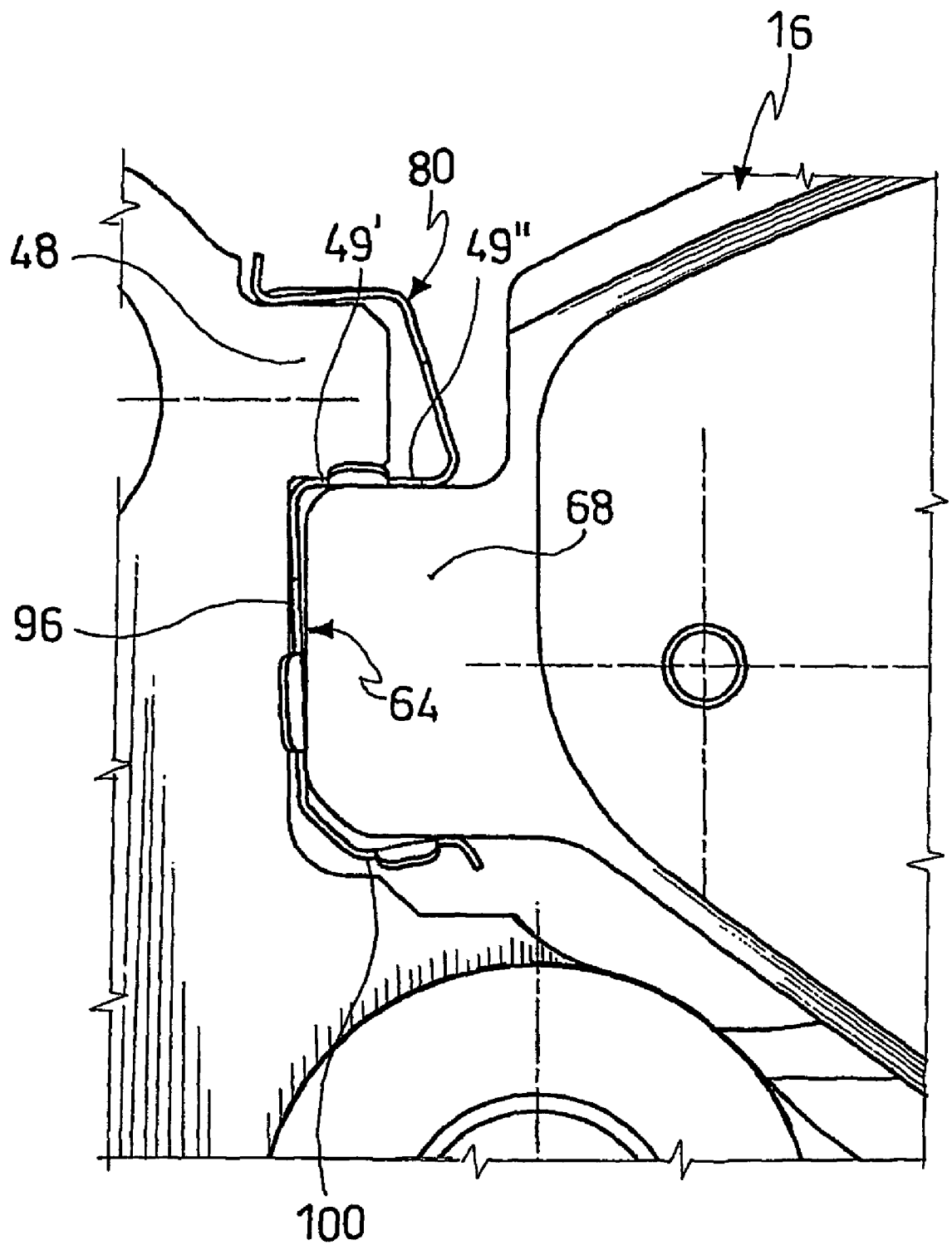
FIG. 6 is a view of the detail V of FIG. 5 of the caliper of FIG. 1, in a configuration with the pads fitted.
Figure 7:
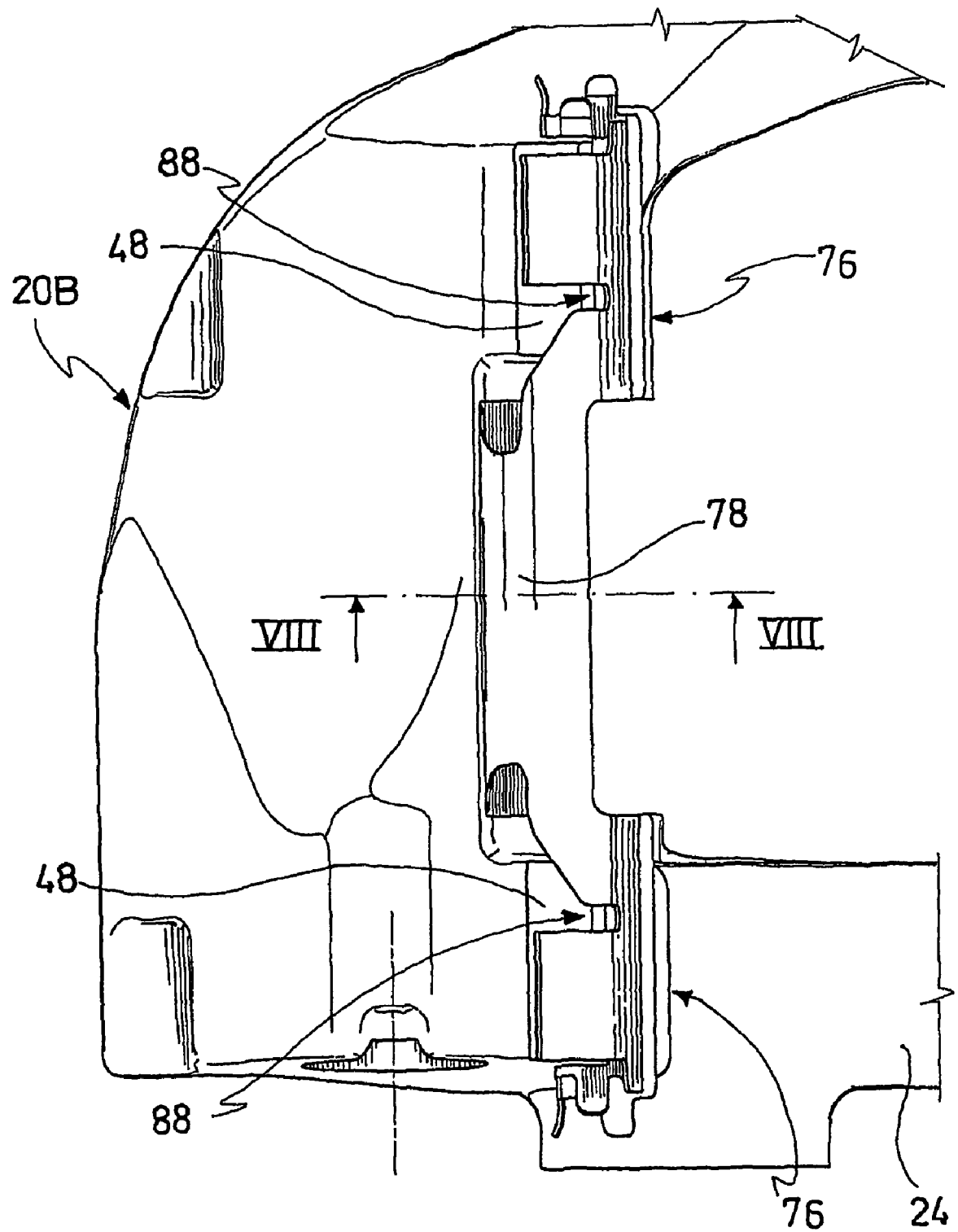
FIG. 7 is a view of a detail of the caliper of FIG. 1, taken on the arrow VII of FIG. 3.
Figure 8:
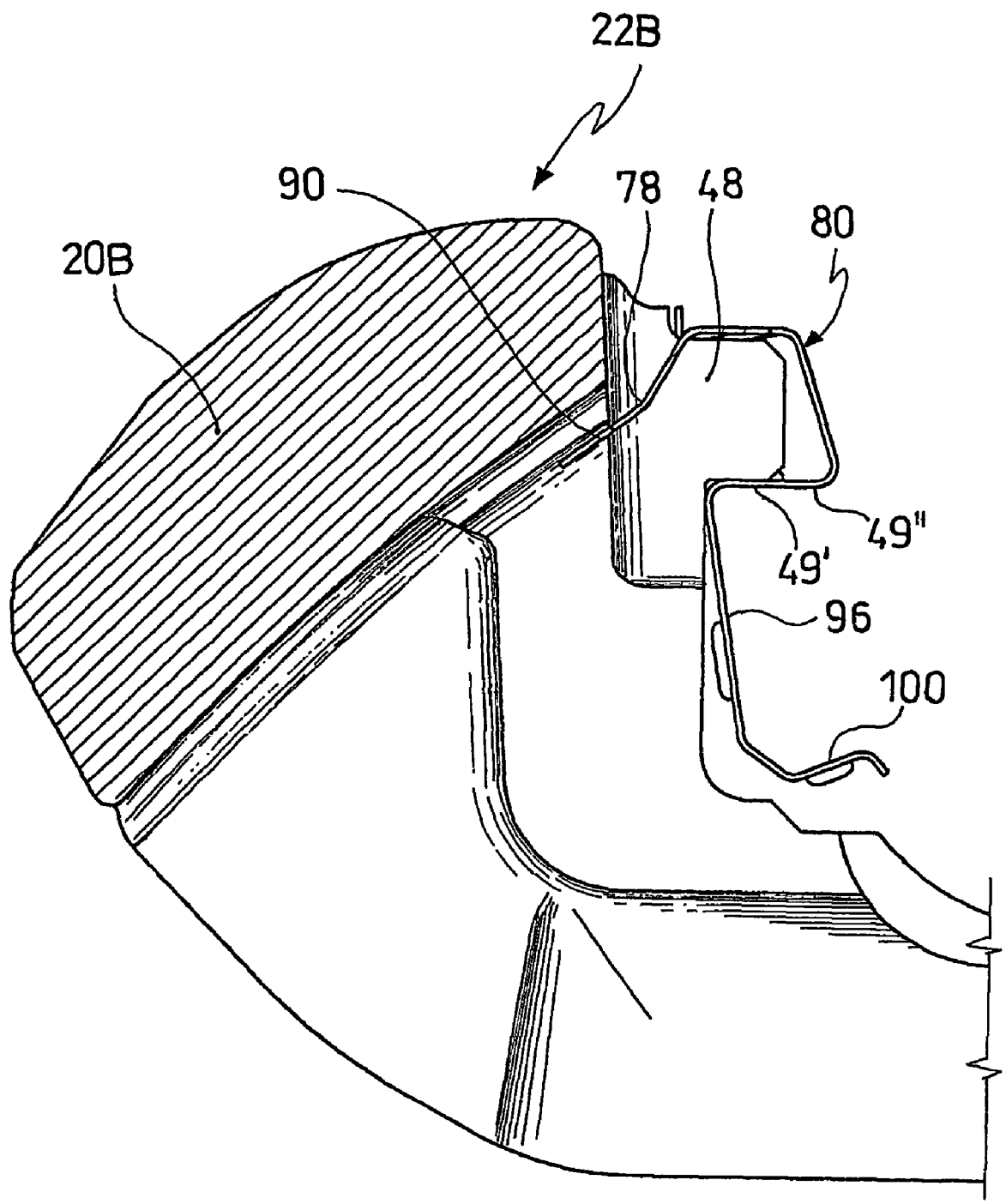
FIG. 8 is a section taken on the line VIII-VIII through the detail of FIG. 7 of the caliper of FIG. 1.
Figure 9:
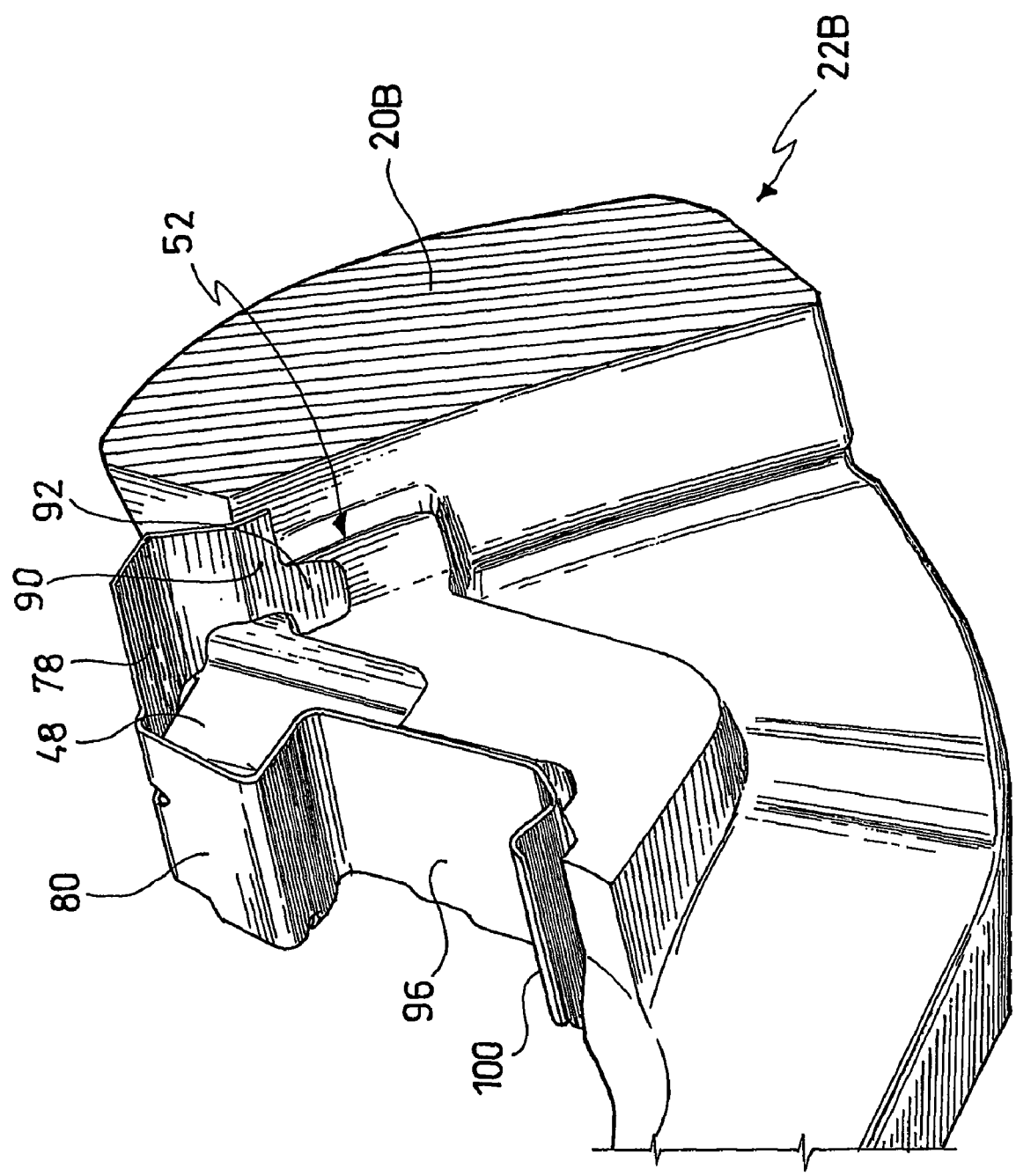
FIG. 9 is a perspective view of the detail of FIG. 8 of the caliper of FIG. 1, and FIGS. 10A-10D are different views of a spring member according to the invention.

The effect of this pivoting is to move the single cantilevered body towards the reaction shoulders 44, as shown in FIG. 6.

As a result, the pads 16 are preloaded by the spring members 70 both radially and tangentially.

During braking, that spring member 70 which, on the basis of the direction of rotation of the brake disc, receives a substantially tangential thrust from the support plates 60 of the pads 16, is further deformed until it comes into abutment with the reaction shoulders 44 of the caliper, whilst the opposite spring member pivots tangentially towards the housing space 32, that is, reduces the tangential preloading.

Upon completion of the braking stage, the spring members reposition the pad in the starting position, keeping it preloaded both radially and tangentially and preventing the setting-up of vibratory phenomena.

As can be appreciated from the foregoing description, the spring member of the present invention overcomes the problems of spring members of the prior art.

In particular, the spring member described prevents undesired vibrations of the pads and of the caliper thereby.

In fact, after the pads have been mounted in their seats, they are preloaded both tangentially and radially and any free movements inside the respective housing spaces, in particular during non-braking stages, are thus eliminated.

Moreover, the devices for anchoring the spring members to the caliper are situated in portions of the spring member which are not working portions since they do not exert a resilient thrust on the pad. The devices themselves are therefore more secure in relation to possible slipping-out of the spring member and the respective fixing surfaces or portions of the caliper body are not marked or damaged by rubbing against movable parts of the spring member.

In order to satisfy contingent and specific requirements, a person skilled in the art will be able to apply to the above-described spring members many modifications and variations all of which, however, are included within the scope of the invention as defined by the appended claims.

What is claimed is:

1. A spring member for disc-brake calipers, suitable for being mounted in a disc-brake caliper, the caliper being suitable for being arranged, in a fitted configuration, astride a brake disc rotatable about an axis defining an axial direction, said caliper comprising a space for housing at least one pad which extends predominantly in a tangential direction parallel to a braking band of the brake disc and perpendicular to the axial direction, the spring member being interposed between a lateral edge of a pad and reaction surfaces of the caliper so as to act resiliently on the pad, the spring member comprising a 'U'-shaped portion suitable for forming a connection with a protuberance of the reaction surfaces which projects in the tangential direction into the housing space, a first resilient portion which extends substantially in a radial direction perpendicular to the axial and tangential directions, is suitable for acting on the pad in a tangential direction, and is operatively connected to the 'U'-shaped portion, and a second resilient portion which extends substantially in the tangential direction, is operatively connected to the first resilient portion, and is suitable for acting on the pad in a radial direction, wherein the first resilient portion is inclined in a manner such that a first connection end of the first resilient portion, connected to the 'U'-shaped portion, is in contact with reaction shoulders and a second connection end, connected to the second resilient portion, is arranged, in the tangential direction, further towards the interior of the housing space than the first connection end, the first and second resilient portions being a single body projecting from the first connection end of the first resilient portion so that, when the spring member and the respective pad are in a fitted configuration in the housing space of the caliper, the pad is acted on resiliently by the spring member both in a radial direction and in a tangential direction, whether or not a braking force is being applied;

wherein the spring member comprises two limbs and a connecting arm between the limbs so that, when the spring member is in a fitted configuration on the caliper, each limb can act resiliently on a respective pad, the pads being arranged opposite one another in the axial direction; said limbs comprise, in the region of a portion attached to the connecting arm, a notch which can separate the connecting arm from a first substantially straight section for attachment to an upper surface of the 'U'-shaped portion so as to permit resilient relative bending between the connecting arm and the first section of each limb.

2. A spring member according to claim 1 in which the first resilient portion is substantially straight.

3. A spring member according to claim 1 in which the spring member can be mounted astride the brake disc on reaction surfaces of the caliper and can cooperate resiliently with lateral edges of a pair of pads arranged on opposite sides of the brake disc.

4. A spring member according to claim 1 in which the 'U'-shaped portion has a substantially trapezoidal shape and can form a snap-coupling with the protuberance of the reaction surfaces.

5. A spring member according to claim 1 in which the connecting arm comprises two fingers disposed at axially opposite ends and suitable for being inserted in corresponding recesses of the caliper so as to permit the location and/or clamping of the spring member in the axial direction.

6. A spring member according to claim 1 in which the connecting arm comprises a thrust portion which can come into abutment with a surface of a respective arch which faces towards a seat for the compatible brake disc.

7. A spring member according to claim 1 in which the spring member comprises lead-in tabs which are arranged substantially axially and are suitable for constituting a lead-in for the axial insertion of the pads in the respective housing spaces.

8. A disc-brake caliper comprising reaction surfaces suitable for cooperating with a spring member according to claim 1.

9. A disc-brake caliper comprising at least one spring member according to claim 1.

10. A disc brake comprising at least one spring member according to claim 1.

11. A spring member structured for attachment with a disc-brake yoke having first and second reaction surfaces, said spring member designed to limit vibrations of a first and second disc-brake caliper pad having lateral edges, said spring member cooperating with the lateral edges of the pads and the reaction surfaces of the disc-brake yoke, said spring member comprising: a connecting arm connecting a first and second limb;

a. said first limb comprising:
i. a U-shaped portion structured to interact with an upper, vertical, and lower surface of the first reaction surface; said U-shaped portion comprising a first substantially straight section for attachment to the upper surface, a second substantially straight section for attachment to the vertical surface, and a third substantially straight section for attachment to the lower surface; said first section and third section extending in a substantially parallel, coplanar direction, and said second section extending in a perpendicular direction thereby connecting the first and third section and thus forming the U-shaped portion;

ii. a first resilient portion attached to the third section, said first resilient portion restricting movement of the pad in a first direction;
iii. a second resilient portion attached to the first resilient portion; said second resilient portion restricting movement of the pad in a second direction;

b. said second limb comprising:
i. a U-shaped portion structured to interact with an upper, vertical, and lower surface of the second reaction surface; said U-shaped portion comprising a first substantially straight section for attachment to the upper surface, a second substantially straight section for attachment to the vertical surface, and third substantially straight section for attachment to the lower surface; said first section and second section extending in a substantially parallel, coplanar direction, and said third section extending in a perpendicular direction thereby connecting the first and second section and thus forming the U-shaped portion;
ii. a first resilient portion attached to the second section, said first resilient portion restricting movement of the pad in a first direction;
iii. a second resilient portion attached to the first resilient portion; said second resilient portion restricting movement of the pad in a second direction;

c. said connecting arm connecting the third section of the first limb to the third section of the second limb, said connecting arm being separated from the first section of the first limb by a first recess, said connecting arm being separated from the first section of the second limb by a second recess; said connecting arm comprising a first and second finger for attachment to the yoke for limiting movement of the spring member; said first and second recesses permitting resilient bending between the connecting arm and the first section of each limb.

12. The first limb of claim 11 comprising a first, second, and third lead-tab for facilitating axial insertion of the pads into the yoke; the lead-tabs integrally attached to the third section, first resilient portion, and second resilient portion.

13. A spring member structured for attachment with a disc-brake yoke having first and second reaction surfaces, said spring member designed to limit vibrations of a first and second disc-brake caliper pad having lateral edges, said spring member cooperating with the lateral edges of the pads and the reaction surfaces of the disc-brake yoke, said spring member comprising: a connecting arm connecting a first and second limb;

a. said first limb comprising:
i. a U-shaped portion structured to interact with an upper, vertical, and lower surface of the first reaction surface; said U-shaped portion comprising a first substantially straight section for attachment to the upper surface, a second substantially straight section for attachment to the vertical surface, and third substantially straight section for attachment to the lower surface;
ii. a first resilient portion attached to the U-shaped portion, said first resilient portion restricting movement of the pad in a first direction;
iii. a second resilient portion attached to the first resilient portion; said second resilient portion restricting movement of the pad in a second direction;

b. said second limb comprising:
i. a U-shaped portion structured to interact with an upper, vertical, and lower surface of the second reaction surface; said U-shaped portion comprising a first substantially straight section for attachment to the upper surface, a second substantially straight section for attachment to the vertical surface, and third substantially straight section for attachment to the lower surface;
ii. a first resilient portion attached to the U-shaped portion, said first resilient portion restricting movement of the pad in a first direction;
iii. a second resilient portion attached to the first resilient portion; said second resilient portion restricting movement of the pad in a second direction;
c. said connecting arm connecting the third section of the first limb to the third section of the second limb, said connecting arm being separated from the first section of the first limb by a first recess, said connecting arm being separated from the first section of the second limb by a second recess; said connecting arm comprising a first and second finger for attachment to the yoke for limiting movement of the spring member; said first and second recesses permitting resilient bending between the connecting arm and the first section of each limb.

14. The first limb of claim 13 comprising a first, second, and third lead-tab for facilitating axial insertion of the pads into the yoke; the lead-tabs integrally attached to the third section, first resilient portion, and second resilient portion.

* * * * *